Oct. 11, 1955 R. A. CLARK, JR 2,720,556

LOUD SPEAKING COMMUNICATION SYSTEM

Filed May 22, 1951 3 Sheets-Sheet 1

Inventor:
Robert A. Clark, Jr.
By: Alois W. Graf
Attorney.

Oct. 11, 1955 R. A. CLARK, JR 2,720,556

LOUD SPEAKING COMMUNICATION SYSTEM

Filed May 22, 1951 3 Sheets-Sheet 2

Inventor:
Robert A. Clark Jr.
By: Alois W. Graf
Attorney.

Oct. 11, 1955 R. A. CLARK, JR 2,720,556

LOUD SPEAKING COMMUNICATION SYSTEM

Filed May 22, 1951 3 Sheets-Sheet 3

Inventor:
Robert A. Clark Jr.
By: Alois W. Graf
Attorney.

United States Patent Office 2,720,556

Patented Oct. 11, 1955

2,720,556

LOUD SPEAKING COMMUNICATION SYSTEM

Robert A. Clark, Jr., Chicago, Ill.

Application May 22, 1951, Serial No. 227,701

16 Claims. (Cl. 179—1)

The present invention relates to a high-speed selective-call loud speaking communication system for interconnecting a central station with a plurality of remotely located stations.

In order to expedite operation of a transportation system, such as a rapid transit network in a city, it would be desirable to provide voice communication between a centrally located dispatcher and various operators located at remote or way stations along the transit route. Preferably, such systems should provide for selective calling so that the central dispatcher may be connected at will to any number of remote stations at a time and carry on conversation. To obtain the maximum speed in contacting the called parties, the conventional ringing or signalling is dispensed with although the connections to the called stations are to be made by means of a code signal transmitting means, such as a telephone dial switch.

Each station is to be provided with an amplifier, loud speaker and a microphone, and any remote or way station should be able to call the central station dispatcher. It furthermore would be desirable if such system provided for loud speaking announcements at various way station terminals. Such loud speaker arrangements would be used for announcements by the local way station operator and also by the central station dispatcher.

Such system should require a minimum of manipulation on the part of the operators and yet at the same time provide for proper volume level irrespective of the number of loud speakers connected at any station and irrespective of the number of stations connected to the central or dispatcher station. While automatic volume control devices are well known in the art, it will be appreciated, however, that certain operating conditions exceed the range over which the conventional automatic volume control circuits can operate. Inasmuch as certain of the equipment might be in use for local paging purposes, it is desired however to have control of all stations when the need arises for broadcasting an announcement to all of them. Hence, the system must be so arranged that the central station dispatcher can cut in at any time. Since the cut-in operation is to take place by means of dial or code signalling, provision must be made for transmitting such signals without undue interference of any voice communication which may be in process at that time.

It therefore is desirable to provide, in accordance with the present invention, a high speed selective call system from a central station dispatcher to remote or way stations by a loud speaking intercommunicating system.

Another object of the present invention is to provide in a communication system voice communication between a central station dispatcher and various remotely located way stations.

Another object of the invention is to provide a system for voice communication along a transit line by a system of loud speakers located at various transit stations.

Another object of the invention is to provide a loud speaking intercommunication system having selective call features whereby the central station dispatcher may be connected as desired to any number of remote or way stations.

A further object of the invention is to provide a loud speaking communication system between a central station and a plurality of remote stations wherein conventional ringing or calling is not used.

Another object of the invention is to provide a loud speaking communication system between a central station and a plurality of remote stations whereby simultaneously two-way communication may be had.

A further object of the invention is to provide a loud speaking communication system between a central station and any selected number of a plurality of remote stations wherein individual channels are provided for incoming and outgoing signals.

Still another object of the invention is to provide in a communication system for selective dial code signalling from a central station to one or more remote stations while portions of the system are in use without audibility of the dial code signal pulses.

Still another object of the invention is to provide in a loud speaking communication system between a central station and a plurality of remote stations for sequential or simultaneous calls from one or more remote stations to the central station.

Still another object of the invention is to provide in a loud speaking communication system between a central station and a plurality of remote stations an arrangement whereby the central station may be connected selectively to one of, a group of, or all of a plurality of remote stations.

Still another object of the invention is to provide a loud speaking communication system having a plurality of remote stations each provided with a plurality of loud speakers wherein a remote station operator may use selectively any number of the loud speakers located there and wherein a central station operator may use selectively the loud speakers at any remote station.

Still another object of the invention is to provide a loud speaking intercommunication system having a central station and a plurality of remote stations wherein any remote station may call the central station by closing a push button switch.

A still further object of the present invention is to provide a loud speaking communication system having a central station and a plurality of remote stations, each remote station having an outgoing amplifier, a microphone, an amplifier and a plurality of loud speakers for paging, wherein the amplification factor of the outgoing amplifier is adjusted automatically to accommodate the microphone signals.

Still another object of the invention is to provide a loud speaking communication having a plurality of remote stations each provided with a plurality of amplifiers, one of which is an outgoing amplifier, the amplification of which is reduced whenever the microphone is connected to transmit signals to said amplifier.

A still further object of the invention is to provide a communication system between a central station and a plurality of remote stations each having an amplifier and a loud speaker wherein high impedance connections are provided whereby any number of remote stations may be connected to the central station without the need of any line balancing arrangement.

A still further object of the invention is to provide a communication system between a central station and a plurality of remote stations wherein the connection between any remote station and the central station can be broken only by the central station operator.

Yet another object of the present invention is to provide a loud speaking communication system between a central station and a plurality of remote stations having means at the central station for dial code signalling to connect any remote station thereto wherein a composite connection is provided at the central station to permit talking and dial signalling at the same time.

Other and further objects of the present invention subsequently will become apparent by reference to the following description taken in conjunction with the accompanying drawings wherein.

Figure 1:
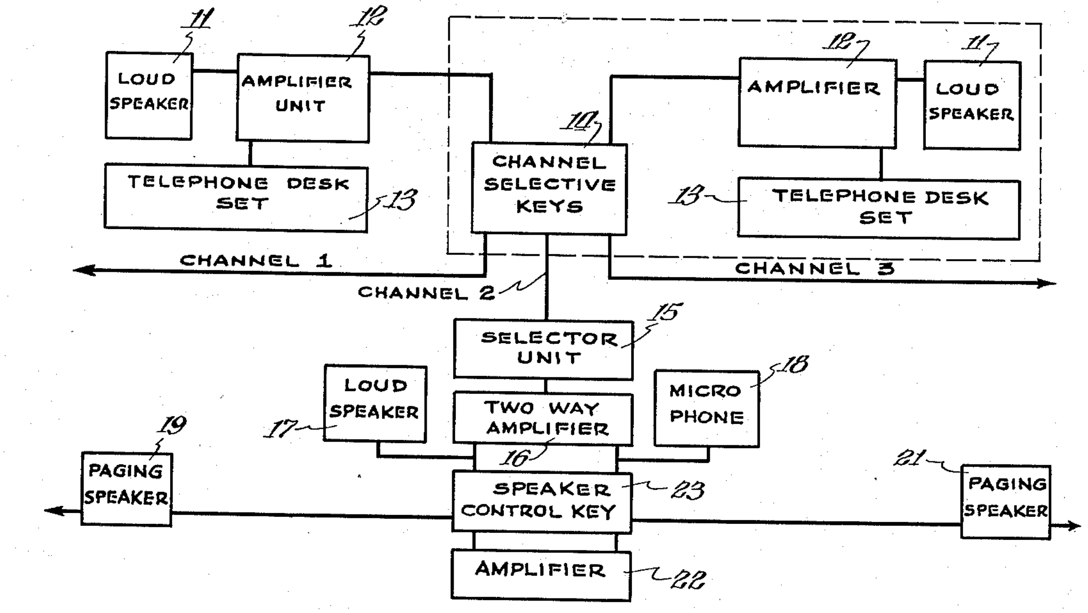
Figure 1 is a block diagram of the system constructed in accordance with the present invention.

The system contemplated by the present invention is illustrated by the block diagram of Figure 1, which has a central station preferably provided with two sets of equipment for dispatchers. The work may be divided between two dispatchers when the load is heavy, or may be handled by a single dispatcher when the load is light. Each dispatcher has a loud speaker 11, an amplifier unit 12, and a telephone desk set 13. The dispatcher's units of equipment are connected to a set of channel selective keys 14. The central station may be connected with each of the remote or way stations by suitable communication channels which may be in the form of wire lines, carrier current lines or radio links. For simplicity of describing the present invention, it may be assumed that three channels radiate in different directions, each of which serves a plurality of remote stations. Each channel consists of an incoming channel and an outgoing channel which most conveniently is provided by means of a four-wire line.

A plurality of remote stations is connected to each four-wire line and consists of an automatic selector unit 15, which is responsive to signals initiated by the telephone desk set dial switch. The selector unit 15 is responsive to at least two different code signals. One code signal connects only that particular selected station to the central station. The other code signal connects that station and a selected number of other stations on the same four-wire line to the central station at the same time. It further is contemplated that on a channel, such as channel 2, the various remote stations may be segregated in various groups so that by the use of a third code signal a particular group of the stations might be connected to the central station.

Each remote station has a two-way amplifier unit 16, which is controlled by the selector unit 15. The remote station is provided with a loud speaker 17 and a microphone 18. The loud speaker 17 is for receiving communication from the central station. The microphone 18 serves as a microphone for communicating with the central station and also serves as a microphone for a paging system. Each station is provided with a plurality of loud speakers 19 and 21, which preferably are arranged in several groups. The loud speakers 19 and 21 are selectively connected to an amplifier 22 by a manually operated speaker control key arrangement 23. The remote station is located at a bus stop or at a railroad station of a rapid transit system. Certain waiting areas or platforms are provided for the public, and hence certain paging speakers are available for announcements of arriving transportation units. The loud speakers 19 and 21, for convenience, will be called platform loud speakers, which should produce a clearly understandable signal above the prevailing background noise levels in the areas of the train platforms without undue annoyance beyond those limits. Announcements coming over those speakers may originate from the local operator of the remote station or by remote control from the central dispatcher. Since the announcements may come from two different sources, and furthermore are subject to different voice levels dependent upon the particular operators and their proximity to their microphones, means must be provided to guard against blasting and distortion.

The dispatcher's amplifier is designed to accommodate input changes up to 30 db with an output change of 2.5 db or less. Provision must be made at the dispatcher's station for transmitting code signals to the remote stations without audibly affecting the loud speaker 17 or the paging speakers 19 and 21.

*Central dispatcher's station*

Figure 2:
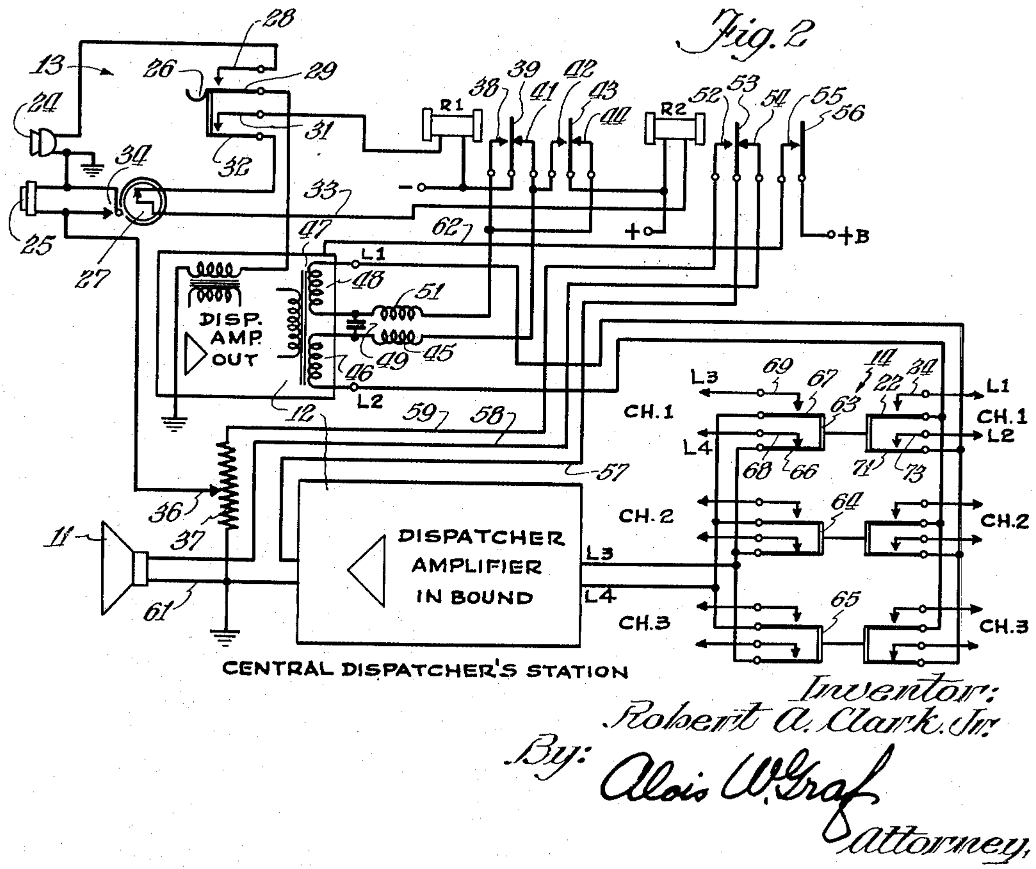
Figure 2 is a block and circuit diagram of a portion of the system shown in Figure 1, which is located at the central station.

Certain details of the central dispatcher's station are shown in Figure 2 wherein it will be noted that a telephone desk set 13 is provided having a microphone 24, a receiver 25, a hook or cradle switch 26, and a dial switch 27. The cradle or hook switch 26 is provided with normally open contacts 28 and 29, which are interposed between the microphone 24 and the input transformer of the outgoing dispatcher's amplifier 13. The hook switch 26 has another pair of contacts 31 and 32 which are normally open and are interposed between the dial switch 27 and a winding of a relay R1. The other side of the dial switch 27 is connected by a conductor 33 to the winding of a relay R2. The dial switch 27, during the dial operation, closes a pair of normally open contacts 34 to short circuit the receiver 25. The microphone 24 is connected between ground and the contact 28 of the hook switch 26. The receiver 25 is connected between ground and an adjustable contact 36 on a resistor 37 having one terminal connected to ground and to one side of the loud speaker 11. The loud speaker 11 has one of its conductors connected directly to the dispatcher's amplifier for inbound signals.

The relay R1 has its winding connected between the contact 31 of the hook switch 26 and the negative terminal of a source of potential. The relay R1 has a normally open contact 38 adapted to be engaged by a movable contact 39, which normally is in closed circuit relation to a contact 41. Another contact 42 is normally in open circuit relation to a movable contact 43, which is normally in closed circuit relation to a contact 44. The contact 39 is connected to the negative terminal of the source of potential for the relay winding of the relay R1, and hence this negative potential is applied to the contact 41, which is connected through an inductor 45 to one-half of the secondary winding 46 of an output transformer 47 having another secondary winding portion 48. The transformer 47 is the output transformer of the outgoing dispatcher amplifier, which supplies voice currents to transmission lines L1 and L2. The inner terminals of the windings 46 and 48 are interconnected by a capacitor 49 so that an alternating current path is provided for the voice signals. The inner terminal of the secondary winding portion 48 is connected through an inductor 51 to the contact 38 of the relay R1. The contact 38 of the relay R1 is also connected to the contact 44, which is normally in closed circuit relation to the movable contact 43, which is connected to the positive terminal of the source of voltage for the relay winding of the relay R2. Thus in the position shown for relay R1 positive potential is being applied to the conductor L1 and negative potential is being applied to the conductor L2. Whenever the hook switch 26 is actuated by the removal of the receiver 25 therefrom a circuit is completed through the switch contacts 31 and 32 to energize the relay R1. This causes the movable contacts 39 and 43 to be actuated and engage respectively contacts 38 and 42, thereby to reverse the polarity of potentials appearing on the lines L1 and L2. Due to the action of the inductors 45 and 51 this change in polarity produces no audible effect upon the voice communication being carried on over lines L1 and L2.

At the time that the hook switch 26 is closed, a circuit is completed from the negative terminal of the source of potential through the winding of the relay R1, the contacts 31 and 32, the dial switch 27 and the conductor 33, through the winding of relay R2 to the positive terminal of the source of potential. The relay R2 has a normally open contact 52 adapted to be engaged by a movable contact 53, which normally engages contact 54. Another contact 55 is normally in open circuit relation with respect to a movable contact 56. The movable contact 53 is connected by a conductor 57 to the output terminals of the inbound dispatcher amplifier 13. The normally closed contact 54 engaged by the contact 53 is connected by a conductor 58 to the loud speaker 11. The contact 52 is connected by a conductor 59 to one terminal of the resistor 37 which has its other terminal connected to ground and to the other conductor 61 extending from the loud speaker 11 to the output terminals of the inbound dispatcher amplifier. The movable contact 56 is connected to the positive terminal of the source of plate potential for the outbound dispatcher amplifier. The cooperating normally open circuit contact 55 is connected by a conductor 62 to the outbound dispatcher amplifier. The actuation of the relay R2 therefore serves to supply plate potential to the outbound dispatcher amplifier thereby placing it in condition for operation. At the same time the actuation of the movable contact 53 breaks the connection to the loud speaker 11 and completes a connection to the receiver 25 through the adjustable resistor 37, which has its movable contact 36 connected to the receiver 25. The inbound dispatcher amplifier has its terminals connected to lines L3 and L4, which are the remaining conductors of the four-wire circuit provided between the central station and the remote stations along one of the channels shown in the block diagram of Figure 1. The lines L3 and L4 are connected to the channel selective keys 14. Similarly the lines L1 and L2 are connected to the channel selective keys. Thus the dispatcher's amplifier 12 may be connected to channel 1, channel 2, channel 3, or to any combination of channels by manipulation of switch keys 63, 64 and 65. Each half of the group of contacts controlled by the switch key has a pair of movable contacts connected to L3 and L4 and another pair of movable contacts connected to L1 and L2. Thus, for example, switch key 63 has movable contacts 66 and 67 arranged for engaging contacts 68 and 69 which are connected to L3 and L4 of channel 1. Two other movable contacts 71 and 72 are arranged to be connected to contacts 73 and 74 which are connected to L1 and L2 of channel 1. It will be apparent to those skilled in the art that similar contact arrangements are provided for each of the keys 64 and 65. Thus, for example, one dispatcher position may be connected to channels 1 and 3 while the remaining dispatcher position is connected to channel 2. Thus it will be appreciated that the channel selective keys indicated by the rectangle 14 of Figure 1 comprises 2 arrangements similar to that illustrated in Figure 2.

It now may be assumed that the dispatcher has removed the hand set from the cradle or hook so as to close the circuits controlled by the hook switch 26. Thereupon the dial 27 is actuated, which produces periodic interruption of the energization of the relays R1 and R2. This produces changes in the polarity appearing across the conductors L1 and L2, which extend to the selector unit 15 illustrated in detail in Figure 3.

*Selector unit*

The selector unit is connected to a transformer 75 having a primary winding formed in two portions 76 and 77 connected to the incoming lines L1 and L2. The inner terminals of the windings 76 and 77 are connected by a capacitor 78 to complete a circuit for the alternating current voice frequencies. The secondary windings 79 and 81 are connected to the two-way amplifier 16. The inner terminals of the windings 76 and 77 are connected across a resistor 82 having one terminal connected to the cathode of a vacuum tube 83. The grid of the vacuum tube is connected through a resistor 84 to an adjustable contact 85 on the resistor 82. The anode of the vacuum tube 83 is connected to one terminal of the winding of the relay RA which has its other terminal connected to the positive terminal of a suitable source of anode potential. The relay RA has a normally open circuit contact 86 adapted to be engaged by a movable contact 87, which is normally in contact with a contact 88. The movable contact 87 is connected to the negative terminal of a suitable source of potential. The contact 86 is connected to one terminal of the winding of relay RB having its other terminal connected to the positive terminal of a suitable source of voltage. The contact 88 is connected to the movable contact 89 of the relay RB, which normally engages contact 91. Movable contact 89 is arranged to engage contact 92. Contact 91 is connected to a conductor 93 which extends to a normally closed pair of contacts 94 and 95 forming a portion of a selector switch mechanism 96. The contact 92 of the relay RB is connected to one terminal of the winding of another relay RC having its other terminal connected to the positive terminal of the source of voltage for these relays. Relay RC has normally closed contacts 97 and 98, the latter being connected to the negative terminal of a source of potential. The contact 97 is connected to a finder arm 99 by a conductor 101. The finder arm 99 is arranged to be moved along a series of contacts 102 forming a part of the selector mechanism 96.

A number of contacts 102 are arranged to be connected together by a suitable code plug represented by the conductor 103. The last contact 102 is connected to a conductor 104, which extends to one terminal of the winding of the relay RD having its other terminal connected to the positive terminal of the relay potential source. The relay RD has normally open contacts 105 and 106, the latter contact being connected to the conductor 104. The contact 105 is connected to a conductor 107, which extends to one terminal of the relay winding of the relay RB and also to one of the contacts of another relay RE.

Relay RD has two contacts 108 and 109 normally in open circuit contact. Contact 108 is connected to the negative terminal of a suitable source of anode potential for the two-way amplifier unit 16. The other contact 109 is connected to a conductor 111, which extends to the two-way amplifier unit 16.

Relay RE has a winding connected between the positive terminal of the relay source of potential and a push button switch 112, which completes a circuit to the negative terminal of the relay source of potential. The purpose of this switch subsequently will become apparent. The relay winding RE is also connected to a normally open circuit contact 113 adapted to be engaged by a movable contact 114, which is connected to a conductor 115 extending to contact 89 of relay RB and contact 88 of relay RA. Another pair of open circuit contacts 116 and 117 are provided for relay RE between the conductor 104 and the negative terminal of the relay source of potential. A pair of normally closed circuit contacts 118 and 119 are connected to conductors 121 and 122. Conductor 121 is connected to one terminal of the winding of the relay RC and to the contact 92 of the relay RB. The conductor 122 is connected to the stepping or motor coil 123 of the selector switch mechanism 96, which has its other terminal connected to the positive terminal of the relay source of potential. Another normally closed pair of contacts 124 and 125 interconnect the conductor 107 and a signal lamp 126 having its other terminal connected to the positive terminal of the source of relay potential.

Figure 3:
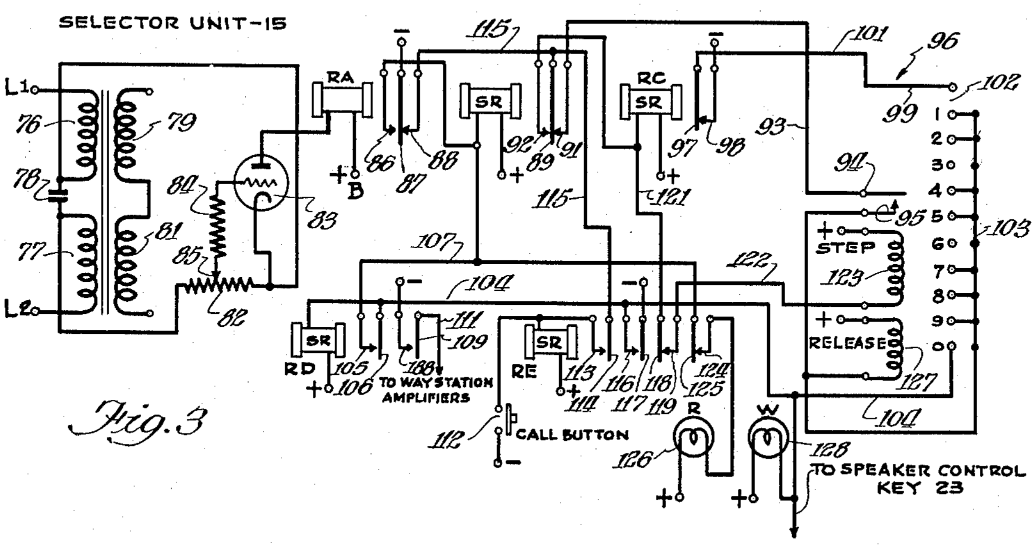
Figure 3 is a circuit diagram of a selector unit located at each of the remote stations.

The contact 95 of the selector switch mechanism 96 is connected to the conductor 103 and to a release coil 127 having its other terminal connected to the positive terminal of the relay source of potential. A signal lamp 128 has one terminal connected to two conductors 104 and 129. The other terminal of the signal lamp 128 is connected to the positive terminal of the relay source of potential. The conductor 129 extends to the speaker controlled key unit 23. Initially it may be assumed that all of the relays and the contacts of the selector unit of Figure 3 are in the positions shown. For the condition where the dispatcher is not calling a station, the polarity of the potential appearing across the lines L1 and L2 is such that the vacuum tube 83 is non-conductive. When the dispatcher removes his hand set to close the hook switch, the relay R1 is actuated to reverse the polarity across the conductors L1 and L2, which produces a change of polarity of the potential appearing across the resistor 82.

Changes in the polarity of the conductors L1 and L2 produce a change of the potential appearing between the grid and cathode of the vacuum tube 83 to produce a flow of current to energize the relay RA. This causes it to open contacts 87 and 88 thereby to interrupt a circuit extending between the negative terminal of the source of potential and the switch contact 94 of the mechanism 96. The closing of the contacts 87 and 86 energizes the winding of the relay RB to cause it to open contacts 89 and 91, thereby also to interrupt the same circuit previously described as extending between the negative terminal of the source of potential and the switch contact 94 of the selector 96. Contacts 89 and 92 are closed to prepare a circuit including the conductor 115 which extends to the contact 114 of the relay RE. Relay RB is a slow to release relay so that it will hold together contacts 89 and 92 subsequent to the deenergization of the relay RA at the end of the first dial signal pulse. The deenergization of the relay RA permits the closing of contacts 87 and 88 thereby momentarily to apply negative potential to one terminal of the winding of the relay RC, which thereupon is energized. The relay RC also is a slow to release relay. The operation of this relay, therefore, interrupts a circuit extending from the negative terminal of the source of potential through the finder arm 99 and the contacts 102 of the selector mechanism 96.

At the same time that energy flows through the winding of the relay RC, energy is transmitted through the conductor 121, the contacts 118 and 119 of relay RE to the stepping or motor coil 123 of the selector mechanism 96. Since the relays RB and RC are slow to release relays, the relay RA may respond to the incoming dial signal pulses and thus bring about a corresponding number of energizations of the stepping or motor magnet coil 123, thereby to move the finder arm 99 along the contacts 102. During the time that the relay RB is energized, a circuit is completed through the signal lamp 126 which indicates that the circuit between the selector unit and the central station is busy.

It was previously stated that each selector unit should be responsive to a number of different code pulses so that a particular station may be called, a group of stations may be called or all stations may be called. Each selector unit is provided with a code plug which comprises a ten-prong unit having certain prongs connected together to bring about certain actions of the finder arm 96. In the arrangement shown in Figure 3 it is assumed that the particular code signal for calling only this station is 334. The code plug also permits this station to be connected into a group of stations, if the signal 64 is transmitted, and all of the stations connected to L1 and L2 respond when 0 is dialed.

The operation of the selector unit will become more readily apparent by assuming such a connection as shown in Figure 3 for a particular station. Let it now be assumed that the first set of dial pulses received by the relay RA is 5. The relay RA accordingly is energized when the dispatcher first removes the hand set from the cradle or the switch hook. As the operator dials the relay RA releases a corresponding number of times. Thus RA is deenergized five times, but meanwhile the relay RB being slow to release retains its contacts 89 and 92 in closed relation. The relay RC is operated and remains closed during the reception of the pulses so that contacts 97 and 98 are separated. The five interruptions in the energization of the relay RA produce five energizations of the motor magnet 123, thereby to move the selector arm 96 to the fifth contact which is connected by the code plug conductor 103 to the negative terminal of the release coil 127. The five pulses having stopped the selector arm 96 on contact 5 will be followed by deenergization of the relay RC so that the contacts 97 and 98 close thereby causing a flow of current from the negative terminal of the source of potential through the contacts 98, 97, the selector arm 99, the contact 5, the conductor 103 and the release magnet 127 which thereby cause the selector arm 99 to be returned to its initial position.

If the first group of pulses should be three in number, the arm 96 will be moved to the contact 3 whereupon the deenergization of the relay RC in closing its contacts 98 and 97 will not complete a circuit to the conductor 103 of the code plug, and hence the arm 99 will remain on contact 3. If the next series of pulses is less or greater than three, the contact arm 96 will stop on a contact which is connected to the conductor 103 thereby to energize the release magnet 127 and return the arm to original position. If the next pulses are three in number, the contact arm will be moved to contact 6. If this is followed now by four more pulses, the selector 99 will be moved to contact O. When this occurs the closing of the contacts 97 and 98 will cause energy to flow therethrough from the negative terminal of the source of potential through the conductor 101, the selector or finder arm 99, the contact O, and conductor 104, through the winding of relay RD to the positive terminal of the source of potential. The relay RD closes contacts 105 and 106 thereby to lock in its winding by completing a circuit through the conductor 107, and the contacts 86 and 87 of relay RA to the negative source of potential. At the same time contacts 108 and 109 are closed to complete a circuit between the negative terminal of a source of potential and a conductor 111, which leads to the way station amplifiers to complete a circuit for the anode potential of these amplifiers.

The lamp 126 will remain energized to indicate that a circuit is completed between the way station and the central station, and hence communication may be carried on between these two stations until the dispatcher replaces his hand set on the cradle or hook switch. When this is done the relay RA is deenergized thereby breaking the contacts 86 and 87 to interrupt a circuit through conductor 107, contacts 105 and 106 and the winding of relay RD. It will be remembered that relay RD is slow to release so that prior to the separation of contacts 105 and 106 another operation occurs. The closing of the contacts 87 and 88 of the relay RA completes a circuit through contacts 89 and 92 of relay RB and the winding of relay RC which operates momentarily. This interrupts another circuit extending between the negative terminal of the source of potential through the winding of the relay RD to the positive terminal. Thus the circuit including the contacts 98 and 97 of the relay RC, the conductor 101, the finder arm 99, contact 10, conductor 104, and the winding of the relay RD is interrupted. The relays RD and RC therefore are released. The release of the relay RB completes a circuit from the negative terminal of the source of potential through contacts 87 and 88 of relay RA, contacts 89 and 91 of relay RB, conductor 93, off normal contacts 94 and 95, through release coil 127 to the positive terminal of potential. This brings about a restoration of the selector arm 99 to its initial position whereupon the contacts 94 and 95 are interrupted. The circuits through the lamp 123, and lamp 126 are broken by the release of relay RA. The release of the relay RD breaks the negative conductor lead of the source of anode potential for the way station amplifiers.

*Remote station*

Figure 4:
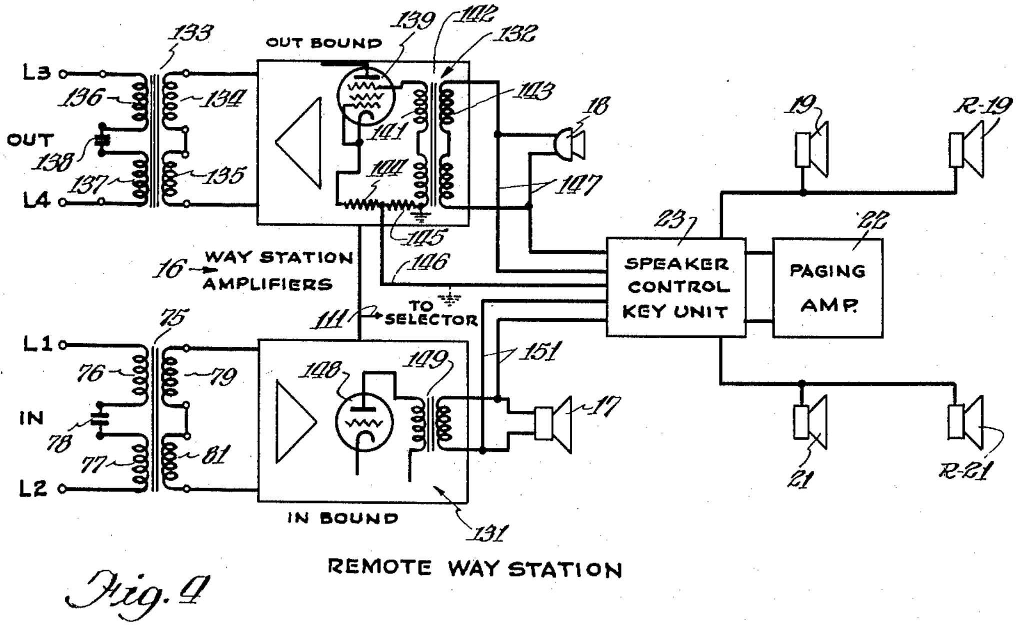
Figure 4 is a block diagram showing the equipment provided at each remote way station.

From Figure 1 it will be apparent that the selector unit 15 is followed by a two-way amplifier 16 associated with a loud speaker 17 and a microphone 18, also shown in Figure 4. From this it will be seen that the two-way amplifier 16 comprises two amplifiers 131 and 132 connected with lines L1, L2 and L3, L4 respectively. The transformer 75 is interposed between the lines L1, L2 and the inbound amplifier 131. A transformer 133 is interposed between the outbound amplifier 132 and the lines L3, L4.

The transformer 133 has two similar primary winding portions 134 and 135, the outer terminals of which are connected to the output of the outbound amplifier 132. The secondary of the transformer 133 comprises two similar winding portions 136 and 137 having the inner terminals interconnected by a capacitor 138. The outer terminals of the two windings 136 and 137 are connected to the lines L3 and L4. A suitable source of anode potential is provided for the amplifiers 131 and 132, the negative conductor 111 of which is shown in Figure 3 as being controlled by the selector unit 15.

The outbound amplifier has an input vacuum tube 139 having a grid circuit including the secondary winding 141 of a transformer 142, the primary winding 143 of which is connected to the microphone 18. The grid to cathode circuit of the vacuum tube 139 also includes two resistors 144 and 145, the latter being connected to ground together with one terminal of the secondary winding 141 of the transformer 142. The common juncture between the resistors 144 and 145 is connected to a conductor 146 leading to the speaker control key unit 23, wherein it normally is connected to ground so that in effect normally the resistor 145 is short circuited. The microphone 18 is also connected by a pair of conductors 147 to the speaker control key unit 23.

The inbound amplifier 131 has an output tube 148 connected through a transformer 149 to the loud speaker 17. The secondary winding of the transformer 149 is also connected to conductors 151 leading to the speaker control key unit 23.

It now will be assumed that the remote way station of Figure 4 desires to call the central station. The operator momentarily pushes the call button 112 of the selector unit 15 shown in circuit detail in Figure 3. This closes the circuit from the negative source of potential through the contacts 112 of the push button, the winding of the relay RE to the positive terminal of the source of potential. The relay RE is locked into circuit by the closing of its contacts 113 and 114, which are interposed between the winding of the relay RE and the conductor 115, which extends through the contacts 88 and 87 of the relay RA to the negative terminal of the source of potential. The closing of the relay RE closes contacts 116 and 117 which are interposed between the conductor 104 and the negative terminal of the source of potential so that the relay RD is energized. The contacts 118 and 119 interposed between the conductors 121 and 122 break a circuit to the motor magnet 123 of the selector mechanism 96 so that the selector mechanism cannot respond to any incoming dial signal pulses. At the same time contacts 123 and 124 are broken in the circuit to the lamp 126.

The closing of the contacts 105 and 106 prepares a circuit for locking in the relay RD through the conductor 107 and the contacts 86 and 87 when the relay RA is energized as a result of the central station operator picking up his hand set. The relay RD closes the contacts 108 and 109 to complete a circuit from the negative terminal of the anode source of potential so that anode current may flow through the conductor 111 to both the inbound and outbound amplifiers. Thereupon the outbound amplifier will pick up voice signals from the microphone and transmit them to the central station.

The way station operator having pushed the call button 112 has no further control over the energization or deenergization of the inbound and outbound amplifiers 131 and 132. The central station operator upon hearing the call from a way station will pick up his hand set, thus causing the polarity on the lines L1 and L2 to be reversed to bring about closing of the relay RA of Figure 3. The relay RA of Figure 3 closes its contacts 86 and 87 thereby to lock into circuit the relay RD. At the same time contacts 87 and 88 are separated to break a circuit through conductor 115 thereby to release the magnet RE so that its contacts 124 and 125 close to prepare a circuit through the lamp 126. Thus a circuit is completed from the positive terminal of the source of potential through the lamp 126, the contacts 124 and 125 of relay RE and conductor 107 through the contacts 86 and 87 of relay RA to the negative terminal of the source of potential. Thus when the lamp 126 is illuminated the way station operator knows that the central dispatcher has heard his call and is answering.

When the conversation has been completed the relay RA is deenergized thereby to break the circuit through the relay RD to deenergize the way station amplifiers 131 and 132. The interruption of the circuit through the contacts 86 and 87 extinguishes the signal lamp 126.

*Speaker control key unit*

Figure 5:
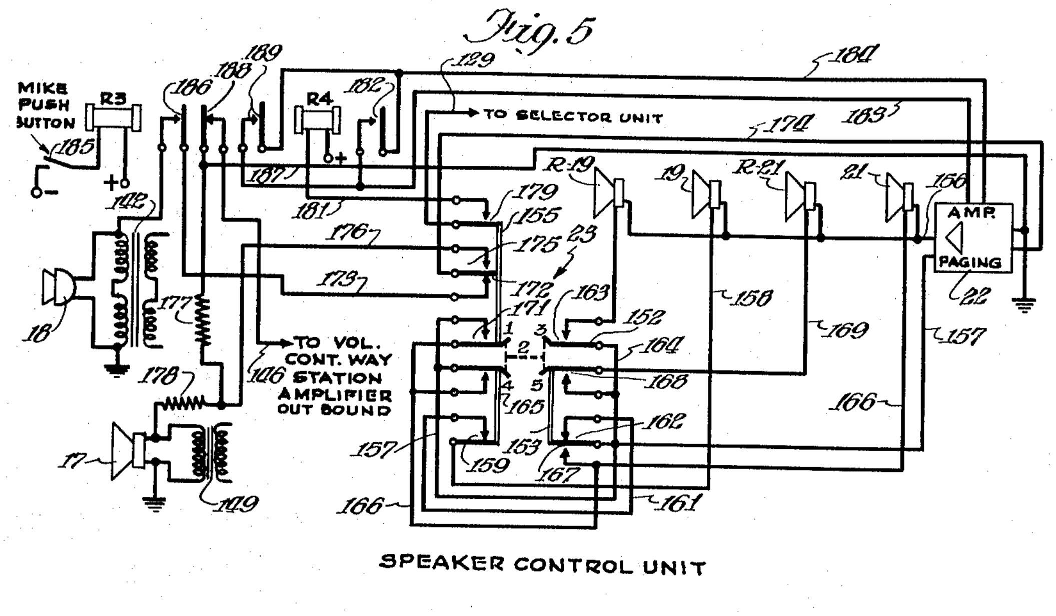
Figure 5 is a circuit diagram of a portion of the equipment represented in the block diagram of Figure 4.

The way station operator is provided with a paging amplifier 22, which is connected to two groups of loud speakers identified as 19 and 21 with certain of the speakers being located remotely to the way station operator. The remote loud speakers are, therefore, indicated as R19 and R21. Certain circuit details under the control of the remote or way station operator are illustrated in Figure 5. The amplifier 22 may be connected in various manners to the loud speakers 19 and 21 by a switch or speaker control key unit 23. The speaker control key unit switch comprises a series of switches 152, 153, 154 and 155. In Figure 5 these switches are shown in the position where the control handle is located in position 2. Positions 2 to 5, therefore, provide different combinations of speakers as required. When the switch is in position No. 1, certain of the loud speakers are connected to be responsive to communications from the central station. The amplifier 22 has two output conductors 156 and 157, the former conductor being common to each of the loud speakers 19, R19, 21 and R21. In the position of the switch shown only the loud speaker 19 is connected to the amplifier 22 through the conductor 156, the loud speaker 19, the conductor 158, the normally closed switch contacts 159 of the switch 154, the conductor 161, the normally closed contacts 162 of the switch 153 and the conductor 157.

When the switch is thrown to position No. 3, the normally open contacts 163 of switch 152 are closed to complete a circuit from the amplifier 22 through conductor 156, loud speaker R19, switch 152, conductor 164 and conductor 157. The circuit through the loud speaker 19 previously described still remains intact, and hence this switch position in effect connects the loud speakers 19 and R19 to the paging amplifier 22.

When the switch is thrown to position 4, the circuit through the loud speaker 19 is interrupted by breaking the normally closed contact 159 of switch 154. At the same time normally open contacts 165 of that switch are closed to complete a circuit from conductor 157 through those contacts to conductor 166 through the loud speaker 21 and the conductor 156 to the amplifier 22.

When the switch is thrown to position 5, normally closed contacts 162 of switch 153 are opened thereby interrupting a circuit extending from the amplifier 22 through conductor 156, loud speaker 19, conductor 158, contacts 159 of switch 154, conductor 161 to contacts 162 of switch 153, which when normally closed complete the circuit to return conductor 157 of the amplifier 22. Normally open contacts 167 are closed to complete a circuit from the amplifier 22 through conductor 157, contacts 167, conductor 166, loud speaker 21 to conductor 156 and the amplifier 22. At the same time normally open contacts 168 of switch 153 are closed to complete a circuit from the amplifier 22 through conductor 157, conductor 164, contacts 168, conductor 169, loud speaker R21 and conductor 156 to the amplifier 22.

When the switch is thrown to position 1, loud speaker 19 is connected to the amplifier 22 through the normally closed contacts 159 of switch 164. The normally open contacts 171 of switch 155 are closed to complete a circuit from the amplifier 22 through conductor 157, contacts 171, conductor 166, loud speaker 21 and conductor 156 to the amplifier 22. This is generally referred to as the unattended position so that loud speakers 19 and 21 are connected to the paging amplifier to receive signals from the central or dispatcher station. Moving the switch to position 1 opens normally closed contacts 172 to interrupt a circuit between conductor 173 and conductor 174, the latter being the input conductor for the paging amplifier 22. The first conductor 173 extends to one of the contacts of the relay R3. Normally open contacts 175 are closed to connect the conductor 174 to the conductor 176, which extends to the common juncture of two resistors 177 and 178. Movement of the switch 155 also closes normally open contacts 179 to connect conductor 129 to conductor 181, which extends to the winding of relay R4 having its other terminal connected to the positive terminal of voltage. The conductor 129 extends to the selector unit shown in detail in Figure 3 to prepare for the energization of the amplifier 22 in response to a call received by the selector unit shown in Figure 3.

In Figure 3 the conductor 129 is connected to the conductor 104, which is connected to the O contact of the bank of contacts 102 of the selector 96 which must be engaged by the finder arm 99 to hold the connection to the lines L1 and L2. The operation of the relays RA, RB and RD, therefore, effectively connects the conductor 129 to the negative terminal of the source of potential so that relay R4 is energized.

When the relay R4 is energized, its normally open contacts 182 are closed to complete a circuit between conductors 183 and 184, which are interposed in the circuit between the vacuum tubes of the paging amplifier 22 and the source of anode potential. When this occurs, the amplifier 22 is in condition to transmit signals received from the dispatcher lines.

It now will be assumed that the way station operator desires to make an announcement over one or more of the platform loud speakers. For simplicity it may be assumed that the speaker control key unit is in position 2 so that the circuits are as shown in Figure 5. The operator picks up the microphone and pushes the microphone push button switch 185, which is connected between the negative terminal of a source of potential and the winding of a relay R3 having its other terminal connected to the positive terminal of the source of voltage. The relay R3 when energized closes its normally open contacts 186, which are interposed between the microphone 18 and the conductor 173, which in turn is connected through normally closed contacts 172 of switch 155 to conductor 174 leading to the input terminal of the paging amplifier 22. This in effect places the microphone 18 across the input terminals of the amplifier 22. At the same time normally closed contacts 188 are opened thereby to interrupt a circuit extending between conductor 146, which leads to the volume control of the way station outbound amplifier and one terminal of a resistor 177 which also is connected by a conductor 187 to the other input terminal of the paging amplifier 22. The opening of the contacts 188, therefore, has the effect of connecting the resistor 177 across the circuit, which includes the resistor 178 and the loud speaker 17.

Operation of the relay R3 also closes the normally open contacts 189 which are in parallel with normally open contacts 182 of relay R4. The closing of the contacts 189 therefore completes a circuit between the conductors 183 and 184 so as to complete a circuit for the anode current of the paging amplifier 22. The operator holds the microphone push button down as long as he is speaking into the microphone 18. When transmission of the message or announcement has been completed, the microphone push button 185 is released whereupon the relay R3 is deenergized to restore its contacts to a position shown in Figure 5. The way station operator can make an announcement over selected loud speakers in accordance with the position of the control knob or key of the speaker control key unit. Thus with the switch thrown in any position, except to position 1, announcements will go out over one or more of the loud speakers 19 and 21.

Since conductor 187 is the grounded input conductor of the paging amplifier 22, the interruption of the circuit which includes the conductor 146 upon energization of the relay R3 has the effect of removing the ground from conductor 146 thereby to remove the effective shunt from the resistor 145 of the outbound amplifier 132 of Figure 4. Thus when the microphone 18 is being used for paging announcements, an additional cathode resistor is inserted in the grid to cathode input circuit of the vacuum tube 189 of the outbound amplifier 132. The provision of this circuit means for introducing an additional resistor in the cathode circuit of that input amplifier is found desirable due to the fact that any automatic volume control circuit provided for the outbound amplifier 132 would not be adequate to reduce the gain sufficiently when the way station operator is speaking directly into the microphone 18.

*Way station amplifier*

Figure 6:
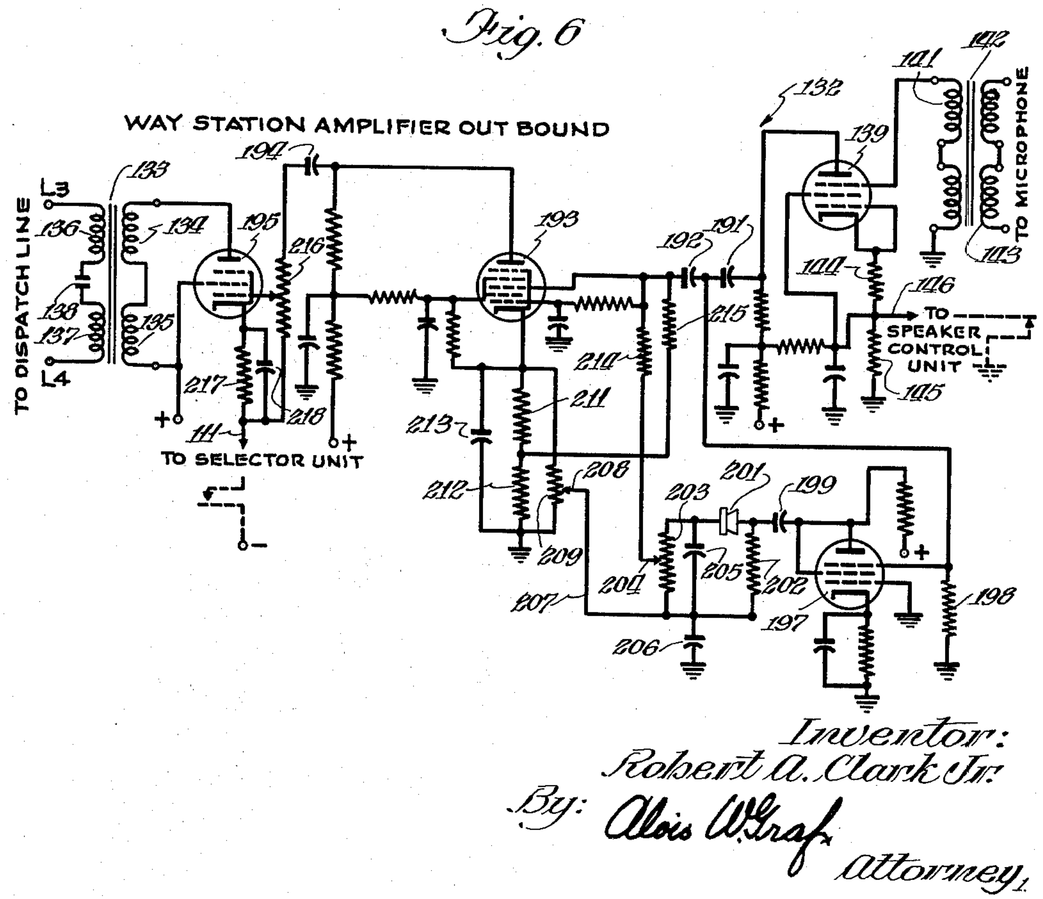
Figure 6 is a circuit diagram of one of the amplifiers employed in the communication system, which typifies the various amplifiers provided.

Certain details of the outbound amplifier 132 are illustrated in Figure 6. In Figure 4 the input tube 139 of the outbound amplifier 132 is shown and the remainder of the circuit indicated by a conventional symbol of a rectangle. In one embodiment the vacuum tube 139 was a 6SJ7 which had its output coupled through two series capacitors 191 and 192 to another amplifier tube 193 which was a 6L7. The output of the vacuum tube 193 was coupled by a capacitor 194 to the input of a third vacuum tube 195 which was a 6V6 having its output connected to the primary windings 134 and 135 of a transformer 133. The secondary windings 136 and 137 were connected to the transmission line L3, L4. A certain portion of the output energy of the vacuum tube 139 is applied to a conductor 196 connected to the common juncture between the capacitors 191 and 192. The conductor 196 is connected to the input circuit of a vacuum tube 197 having a grid to ground resistor 198. The output of the vacuum tube 197 is transmitted through a coupling capacitor 199 to a rectifier 201 connected in a series circuit including a fixed resistor 202 and a resistor 203 having an adjustable contact 204. The resistor 203 is by-passed by a capacitor 205 and a suitable capacitor 206 extends between ground and the common juncture of the resistors 202, 203 and the capacitor 205. This common juncture is connected to a conductor 207 which leads to the adjustable contact 208 of a resistor 209. The resistor 209 is in parallel with two resistors 211 and 212, which are by-passed by a capacitor 213 and extend between ground and the cathode of the vacuum tube 193. The adjustable contact 204 of the resistor 203 is connected to one terminal of the resistor 214 having its other terminal connected to the input grid of the vacuum tube 193. The input grid of the vacuum tube 193 has a grid to cathode circuit which includes a resistor 215 connected to the common juncture of the resistors 211 and 212.

The rectifier 201 which receives amplified energy from the vacuum tube 197 develops an automatic gain control potential across the resistor 203. A portion of this voltage as determined by the position of the adjustable contact 204 is applied between the grid of the vacuum tube 193 and a selected point on the resistor 209, which is in parallel with the cathode to ground resistors 211 and 212. Thus a certain portion of the voltage is included in the grid to cathode circuit of the vacuum tube 193. This limits the signal output variation to 3.5 db for input changes up to 20 db, with negligible distortion throughout this range. The controlled output of the vacuum tube 193 is supplied to the input circuit of the vacuum tube 195, which is connected to the transmission line. The input circuit of the vacuum tube 195 includes a resistor 216 extending between the coupling capacitor 194 and the conductor 111. The conductor 111 is connected to the cathode of the vacuum tube 195 through a bias resistor 217, which is suitably by-passed by a capacitor 218. It will be recalled that the conductor 111 is connected to the selector unit shown in detail in Figure 3, which completes a connection to the negative terminal of the source of anode potential. Thus, normally the vacuum tube 195 does not have anode potential applied thereto unless the selector unit completes the circuit.

It is believed that further description of the circuits shown in Figure 6 is not necessary, since the remaining components perform the conventional functions which are readily understood by those skilled in the art. The circuit shown in Figure 6, however, is representative of the various circuits employed in the different amplifiers. The inbound way station amplifier is similar to the one shown in Figure 6 with the exception that it does not have the pre-amplifier tube 139. The inbound way station amplifier, therefore, has two amplifier tubes and an amplified gain control circuit. Thus the 6L7 tube of that amplifier, which is similar to the tube 193 of the outbound amplifier, receives signals directly from the incoming lines L1 and L2. The automatic gain control circuit is adjusted to limit speaker output variation to 2.5 db for input changes up to 30 db, with negligible distortion throughout that range.

The circuit arrangement shown in Figure 6 is also indicative of the circuit employed in the inbound amplifier at the central station, since that circuit is substantially the same as the inbound way station amplifier. The outbound amplifier at the dispatcher or central station employs but a single tube, which in a particular embodiment was a 6V6 tube.

The paging amplifier 22 of the way station likewise is similar to the outbound way station amplifier except that in place of a single output tube, such as the tube 195, another tube, such as the 6J5, was used to supply signals to a push-pull amplifier employing two 6L6 tubes.

For the purpose of illustrating and describing the present invention certain circuit details have been specified and reference has been made to a particular installation. The invention, however, is not to be limited to the particular installation nor to the specific circuit elements shown in the drawing, since such variations are contemplated as may be commensurate with the spirit and scope of the invention set forth in the accompanying claims.

*General description*

For convenience in understanding the present invention the application to a particular installation is believed to be helpful. In one instance certain features of the invention were employed for a communication system used with an elevated rapid transit line having branches extending from the down-town area North, West and South. Three channels, each consisting of two two-wire lines, were employed having a total capacity of 75 remote or way stations. By means of the teaching of the present invention there was provided a high-speed selective call dispatcher to way station loud speaking intercommunication system along the rapid transit railroad line which had loud speakers on certain train platforms so that announcements could be made to the public or to employees. The selective call system permitted the central dispatcher to be connected at will to any desired way station to communicate with the operator thereat, or to call a group of stations, or to call all stations in the system. Suitable controls, such as the automatic gain control circuit arrangements, and certain switching arrangements heretofore described permitted announcements to be made over way station speakers from either the way station operator or from the central dispatcher.

The central station or dispatcher's amplifier has its incoming amplifier connected to the incoming telephone lines so that any call from any way station is immediately reproduced. The only time when the loud speaker is not operating is when the dispatcher has lifted his hand set to close the hook switch whereupon the loud speaker is muted. The central station dispatcher, by means of a telephone dial switch, can dial any remote or way station, a group of way stations, or all of the way stations. The dial switch signals are impressed upon the lines through a composite connection whereby the polarity of the lines is reversed thereby to bring about a response at the selector unit at each way station. The dial signal pulses do not interfere with communication which may be going out over any of the channels. The selective call arrangement when completing a circuit to a particular call station does not prevent any other way station from coming onto the line at any time through the operation of its local call key or push button switch. Thus, any way station in an emergency may break in.

Each way station is provided with two signal lights, such as those shown in Figure 3, to indicate whenever the dispatcher is connected to the lines and the other to indicate that the dispatcher is awaiting the communication from the way station which has signaled the central station.

All of the selector units are so arranged that the system will function properly irrespective of the location and distance from the central office, although in the particular installation referred to the most remote station was 20 miles from the central station.

The system heretofore described permits the central station operator to lift his hand set and dial any selected code dependent upon whether he desires to be connected to a single station, a group of stations, or all of the stations. The automatic selector units, such as those shown in Figure 3, respond accordingly and when the dispatcher replaces his hand set the selector units are returned to normal condition.

The way station operator has a call button for signaling the dispatcher or central station and thereafter has no further control over the equipment, since this is subject to the dispatcher. The way station operator has a microphone push button which is actuated in order to make an announcement over the loud speakers. The number and grouping of loud speakers at a way station may be determined by throwing the speaker control key switch unit to selected positions. The same microphone at the way station is employed for announcements locally over the loud speakers and communication with the central station. This, therefore, provides a simple to operate loud speaking intercommunication system of great flexibility and maximum reliability.

I claim as my invention:

1. A loud speaker communication system having a central station and a plurality of remote stations each having an amplifier normally deenergized and a microphone, a transmission line interconnecting said stations, a high impedance connection between said line and each of said amplifiers, means at each remote station including a push button switch and a relay for controlling the energization of its amplifier, and means at the central station for actuating said relay to deenergize said amplifier.

2. A loud speaker communication system having a central station and a plurality of remote stations each provided with an amplifier and a microphone, a transmission line interconnecting said stations, a high impedance connection between said line and each of said amplifiers, means at each remote station including a push button switch and a relay for controlling the energization of its amplifier, a hook switch at said central station connected to apply a continuous signal to said transmission line, code signalling means at said central station, means at said remote station responsive to said hook switch signal and a code signal to actuate said relay, and means at the remote station for actuating said relay to deenergize said amplifier in response to further actuation of said hook switch to remove said signal.

3. A loud speaker communication system having a central station and a plurality of remote stations each provided with a code responsive device, an amplifier normally deenergized and a loud speaker, a plurality of transmission lines interconnecting said stations with said central station, a high impedance connection between each of said amplifiers and one of said transmission lines, and code signaling means for actuating said code responsive devices whereby the central station may be connected to any number of the remote stations on a transmission line by controlling the energization of said amplifiers, said central station including a composite connection between said code signaling means and the transmission lines whereby direct current code signals may be applied without disturbance of the voice frequencies being transmitted.

4. A communication system having a central station, a plurality of incoming and outgoing communication channels extending therefrom, a plurality of remote stations associated with each set of incoming and outgoing channels, each remote station having an amplifier connected to an incoming channel, an amplifier connected to an outgoing channel, and a third amplifier connected to a loud speaker, a microphone connected to said latter amplifier and to said outgoing amplifier, a switch and a relay for controlling the energization of said third amplifier, for transmission of signals from said microphone to said loudspeaker, and a switch and a relay for controlling the energization of said second amplifier for transmission of microphone signals over said outgoing channel.

5. A communication system having a central station, a plurality of incoming and outgoing communication channels extending therefrom, a plurality of remote stations associated with each set of incoming and outgoing channels, each remote station having an amplifier connected to an incoming channel, an amplifier connected to an outgoing channel, and a third amplifier connected to a loud speaker, a microphone connected to said latter amplifier and to said outgoing amplifier, a switch and a relay for controlling the energization of said third amplifier for transmission of microphone signals to said loudspeaker, and a switch and a relay for controlling the energization of said second outgoing amplifier for transmission of microphone signals over said outgoing channel, and means controlled by said latter relay for increasing the cathode bias of the input tube of said outbound amplifier.

6. A communication system comprising a central station, a plurality of communication channels extending therefrom, a plurality of remote stations connected to each of said channels, code signal transmitting means at said central station for calling any number of said remote stations at a time, an amplifier at each remote station connected to one of said channels, means at each remote station responsive to each one of at least two different sets of code signals for energizing said amplifier, and means at each remote station responsive to another signal for deenergizing said amplifier.

7. A communication system comprising a central station, a plurality of communication channels extending therefrom, a plurality of remote stations connected to each of said channels, code signal transmitting means at said central station for calling any number of said remote stations at a time, an amplifier at each remote station connected to one of said channels, and means at each remote station responsive to each one of at least two different sets of code signals for energizing said amplifier.

8. A communication system comprising a central station, a plurality of communication channels extending therefrom, a plurality of remote stations connected to each of said channels through a composite connection, code signal transmitting means at said central station for calling any number of said remote stations at a time, said code signal transmitting means including a source of direct current potential normally connected to an outgoing channel, and relay means for reversing the connection of said source of direct current potential to said channel without interference with any communication which may be going out over any channel.

9. In a communication system having a central station and a remote station, a pair of transmission lines interconnecting said stations, a source of direct current potential at said central station, means including a composite connection to said lines normally connected to said source of direct current potential, and code signal calling means including a relay for reversing the normal connection between said lines and said source.

10. In a communication system having a central station and a remote station, a plurality of transmission lines interconnecting said stations, a source of direct current potential at said central station, means including a composite transformer normally connecting said source of direct current potential with said lines, code signal calling means including a relay for reversing the normal connection between said lines and said source, vacuum tube means at said remote station responsive to the reversal of direct current polarity of said lines, and an automatic selector responsive to said vacuum tube means to connect said remote station to said line whenever its code signal has been received.

11. In a loud speaking communication system, the combination comprising a central station, a plurality of remote stations, incoming and outgoing channels interconnecting said stations, each remote station having an amplifier normally deenergized and connected to the incoming channel from said central station, manually operable means at said remote station for causing energization only of said amplifier, and means responsive to a signal from said central station for deenergizing said amplifier.

12. In a loud speaking communication system, the combination comprising a central station having code signal transmitting means, a plurality of remote stations, incoming and outgoing channels interconnecting said stations, each remote station having an amplifier normally deenergized and connected to the incoming channel from said central station, a selector unit at each remote station responsive to said code signals for causing the energization of said amplifier, manually operable means at said remote station for causing energization only of said amplifier, and means at said remote station responsive to a signal from said central station for deenergizing said amplifier.

13. A communication system comprising a central station, a plurality of communication channels extending therefrom, a plurality of remote stations connected to each of said channels, means at said central station for calling simultaneously any number of said remote stations, an amplifier at each remote station, and means at each remote station responsive to a calling signal for automatically connecting its amplifier to the communication channel.

14. In a loud speaking communication system the combination comprising a central station interconnected with a plurality of remote stations by a transmission line and arranged to be selectively connected to said remote stations by automatic selector means thereat, said stations each being connected to said transmission line by a composite transformer circuit, a source of direct current potential at said central station connected to said transmission line, code signal means at said central station for selectively calling any remote station by reversing the connection between said transmission line and said source of direct current potential, and high impedance means at each remote station responsive to said reversals of potential on said line to actuate said selector means.

15. In a loud speaking communication system the combination comprising a central station and a plurality of remote stations arranged to be selectively interconnected by automatic selector means thereat, each remote station having an amplifier connected to a central station and a second amplifier adapted to be connected to a plurality of loud speakers, a plurality of loud speakers, manually operable multi-position switch means for connecting said second amplifier to selected loud speakers or groups of loud speakers, a microphone connected to said first amplifier and a switch for connecting said microphone to said second amplifier, and circuit means responsive to actuation of said switch for decreasing the amplification factor of said first amplifier.

16. In a loud speaking communication system the combination comprising a central station and a plurality of remote stations arranged to be selectively interconnected by automatic selector means thereat, each remote station having an amplifier connected to said central station and a second amplifier adapted to be connected to a plurality of loud speakers, a plurality of loud speakers, manually operable switching means for connecting said second amplifier to selected loud speakers or groups of loud speakers, a microphone connected to said first amplifier, a switch for connecting said microphone to said second amplifier, and circuit means responsive to actuation of said switch for decreasing the amplification factor of the first amplifier by increasing the cathode bias of one of the vacuum tubes thereof.

References Cited in the file of this patent

UNITED STATES PATENTS

| | | |
|---|---|---|
| Re. 21,835 | Mitchell | June 17, 1941 |
| 1,586,554 | Goodrum | June 1, 1926 |
| 1,601,969 | Jammer | Oct. 5, 1926 |
| 2,162,371 | Campbell | June 13, 1939 |
| 2,230,360 | Mitchell | Feb. 4, 1941 |
| 2,247,507 | Lanham et al. | July 1, 1941 |
| 2,336,888 | Reier | Dec. 14, 1943 |
| 2,369,351 | Herrick | Feb. 13, 1945 |
| 2,427,850 | Gehman | Sept. 23, 1947 |
| 2,496,186 | Walter | Jan. 31, 1950 |
| 2,496,629 | Lamberty et al. | Feb. 7, 1950 |
| 2,543,986 | Prahm | Mar. 6, 1951 |
| 2,547,854 | Campbell | Apr. 3, 1951 |
| 2,567,484 | Ivens | Sept. 11, 1951 |
| 2,580,709 | Wicks | Jan. 1, 1952 |
| 2,623,124 | Ivens et al. | Dec. 2, 1952 |